United States Patent
Yeo

(10) Patent No.: US 9,608,847 B2
(45) Date of Patent: Mar. 28, 2017

(54) ANALOG DISTRIBUTED ANTENNA SYSTEM FOR PROCESSING ETHERNET SIGNAL

(71) Applicant: SOLiD, INC., Seongnam-si, Gyeonggi-do (KR)

(72) Inventor: Yeongshin Yeo, Gwangmyeong-si (KR)

(73) Assignee: SOLID, INC., Seongnam-si (KR)

( * ) Notice: Subject to any disclaimer, the term of this patent is extended or adjusted under 35 U.S.C. 154(b) by 0 days.

(21) Appl. No.: 15/079,391

(22) Filed: Mar. 24, 2016

(65) Prior Publication Data

US 2016/0211993 A1 Jul. 21, 2016

Related U.S. Application Data

(63) Continuation of application No. PCT/KR2014/007585, filed on Aug. 14, 2014.

(30) Foreign Application Priority Data

Dec. 17, 2013 (KR) ........................ 10-2013-0157069

(51) Int. Cl.
  *H04J 1/10* (2006.01)
  *H04L 25/20* (2006.01)
  *H04L 5/00* (2006.01)

(52) U.S. Cl.
  CPC ............ *H04L 25/20* (2013.01); *H04L 5/0098* (2013.01)

(58) Field of Classification Search
  None
  See application file for complete search history.

(56) References Cited

U.S. PATENT DOCUMENTS

| 2007/0147523 | A1 | 6/2007 | Sakata et al. |
| 2010/0239247 | A1* | 9/2010 | Kani ................... H04J 14/0227 398/41 |
| 2014/0219655 | A1* | 8/2014 | Koley ................ H04B 10/5051 398/45 |
| 2014/0341569 | A1* | 11/2014 | Choi ................ H04B 10/25753 398/34 |
| 2015/0036728 | A1* | 2/2015 | Nguyen .................... H04L 1/06 375/222 |

FOREIGN PATENT DOCUMENTS

| JP | 2005-175754 A | 6/2005 |
| JP | 2007-174353 A | 7/2007 |
| KR | 10-2002-0053400 A1 | 7/2002 |
| KR | 10-2006-0044114 A1 | 5/2006 |

OTHER PUBLICATIONS

International Search Report for PCT/KR2014/007585 dated Nov. 14, 2014.

* cited by examiner

*Primary Examiner* — Kibrom T Hailu
(74) *Attorney, Agent, or Firm* — Sughrue Mion, PLLC

(57) ABSTRACT

A device included in an analog distributed antenna system includes a first analog signal processing unit for receiving an analog communication signal, a first modulation/demodulation unit for converting a digital Ethernet signal received from an Ethernet network into an analog Ethernet signal, a multiplexing unit for multiplexing the analog communication signal signal-processed by the analog signal processing unit and the analog Ethernet signal converted by the modulation/demodulation unit, and a transmission unit for transmitting, to other devices included in the analog distributed antenna system, the analog communication signal and the analog Ethernet signal, which are multiplexed by the multiplexing unit.

10 Claims, 5 Drawing Sheets

ANALOG DISTRIBUTED ANTENNA SYSTEM FOR PROCESSING ETHERNET SIGNAL

CROSS REFERENCE TO RELATED APPLICATIONS

This application is a Continuation of International Application No. PCT/KR2014/007585, filed Aug. 14, 2014, and claims priority from Korean Patent Application No. 10-2013-0157069 filed Dec. 17, 2013, the contents of which are incorporated herein by reference in their entireties.

BACKGROUND

1. Field

The inventive concept relates to a relay device in an analog distributed antenna system, and more particularly, to a relay device in an analog distributed antenna system, in which Ethernet signal processing is possible.

2. Description of Related Art

In general, various types of mobile communication systems, including mobile phones and personal communication services, include mobile switching centers, base stations, and mobile stations. Each base stations has a certain service coverage, based on the strength and service quality of radio waves received by mobile stations. In the design of a network, based on such a service coverage, the base stations are appropriately arranged and built such that a predetermined area can be covered with a plurality of base stations. However, as the strength and quality of radio waves are relatively degraded due to characteristics of the radio waves, there are generated a plurality of shadow areas in which conversation by telephone is impossible. A relay is a device for solving such shadow areas. The relay receives a signal input from a base station to transmit the received signal to a terminal, and receives a signal from the terminal to transmit the received signal to the base station.

Meanwhile, signals transmitted through an Ethernet network are transmitted in a digital manner. The signals are transmitted by using an Internet protocol, and conversion of data format is required to transmit digital signals through the Ethernet network in an analog distributed antenna system.

When the analog distributed antenna system is changed into a digital distributed antenna system, there is no room for the occurrence of troubles, but enormous cost is required. Therefore, separate components are required to transmit or receive data through a digital Ethernet network by using a previously configured analog communication network.

SUMMARY

An embodiment of the inventive concept is directed to an analog distributed antenna system and relay devices constituting the same, in which a simple component is added without converting the analog distributed antenna system into a digital distributed antenna system, so that the transmission of Ethernet signal is possible.

Another embodiment of the inventive concept is directed to a relay device capable of easily extending the bandwidth of Ethernet signals transmitted through an analog distributed antenna system.

According to an aspect of the inventive concept, there is provided a device included in an analog distributed system, the device including: a first analog signal processing unit configured to receive an analog communication signal; a first modulation/demodulation unit configured to convert a digital Ethernet signal received from an Ethernet network into an analog Ethernet signal; a multiplexing unit configured to multiplex the analog communication signal signal-processed by the analog signal processing unit and the analog Ethernet signal converted by the modulation/demodulation unit; and a transmission unit configured to transmit, to other devices included in the analog distributed antenna system, the analog communication signal and the analog Ethernet signal, which are multiplexed by the multiplexing unit.

According to an exemplary embodiment, the first modulation/demodulation unit may be provided in plurality to each receive an independent Ethernet signal and convert the receive Ethernet signal into an analog Ethernet signal. The device may include a signal combiner configured to combine, as a single signal, analog Ethernet signals output from the plurality of first modulation/demodulation units, and output the combined signal to the multiplexing unit.

According to an exemplary embodiment, the multiplexing unit may multiplex the received signal in a subcarrier multiplexing (SCM) manner.

According to an exemplary embodiment, the transmission unit may transmit the analog Ethernet signal by using a frequency band not occupied by the analog communication signal.

According to another aspect of the inventive concept, there is provided a device included in an analog distributed system, the device including: a demultiplexing unit configured to demultiplex an analog signal transmitted from the another device included in the analog distributed antenna system to be separated into a radio communication signal and an Ethernet signal; and a second modulation/demodulation unit configured to convert the separated analog Ethernet signal into a digital Ethernet signal.

According to an example embodiment, the device may further include an Ethernet port configured to receive a digital Ethernet signal output from the second modulation/demodulation unit.

According to an exemplary embodiment, the second modulation/demodulation unit may transmit, through the Ethernet port, the digital Ethernet signal to any one of a radio access point, a switch, a router, and a hub, which is connected to the Ethernet port to provide connection with at least one of a mobile communication terminal and an external computing device.

According to an exemplary embodiment, the device may further include an analog signal processing unit for femtocells or smallcells, configured to receive an Ethernet signal converted by the second modulation/demodulation unit, and perform signal processing such that the received Ethernet signal is transmitted to a femtocell or smallcell base station device.

According to an exemplary embodiment, the second modulation/demodulation unit may be provided in plurality to each receive an independent analog Ethernet signal. The analog signal processing unit for femtocells or smallcells may be provided in plurality, respectively corresponding to the plurality of second modulation/demodulation units, to perform signal processing for frequency bands of the independent analog Ethernet signals.

According to the inventive concept, a digital Ethernet signal is modulated by using the modulation/demodulation unit and then transmitted through the analog distributed antenna system, or an Ethernet signal in a received analog signal is demodulate by using the modulation/demodulation unit, so that the digital Ethernet signal can be normally transmitted to a remote unit.

Also, a large number of remote devices are connected to a donor device in a distributed antenna system network by using base station devices for smallcells or femtocells using an Ethernet backhaul commercialized in recent years. When it is required to increase capacity, the base station devices for smallcells or femtocells are connected to the remote unit to directly provide services, or a base station signal is re-input to the remote device or the distributed antenna system network to provide services, thereby additionally creating a new capacity.

Also, in a 1:N multiple remote configuration of the distributed antenna system, separate modem units are extended in parallel for each optical module (analog optical transmission unit) in a donor unit, so that it is possible to extend Ethernet service bandwidth for each remote unit.

BRIEF DESCRIPTION OF THE FIGURES

Exemplary embodiments of the inventive concept will be more clearly understood from the following detailed description taken in conjunction with the accompanying drawings in which.

DETAILED DESCRIPTION OF EXEMPLARY EMBODIMENTS

Figure 1:
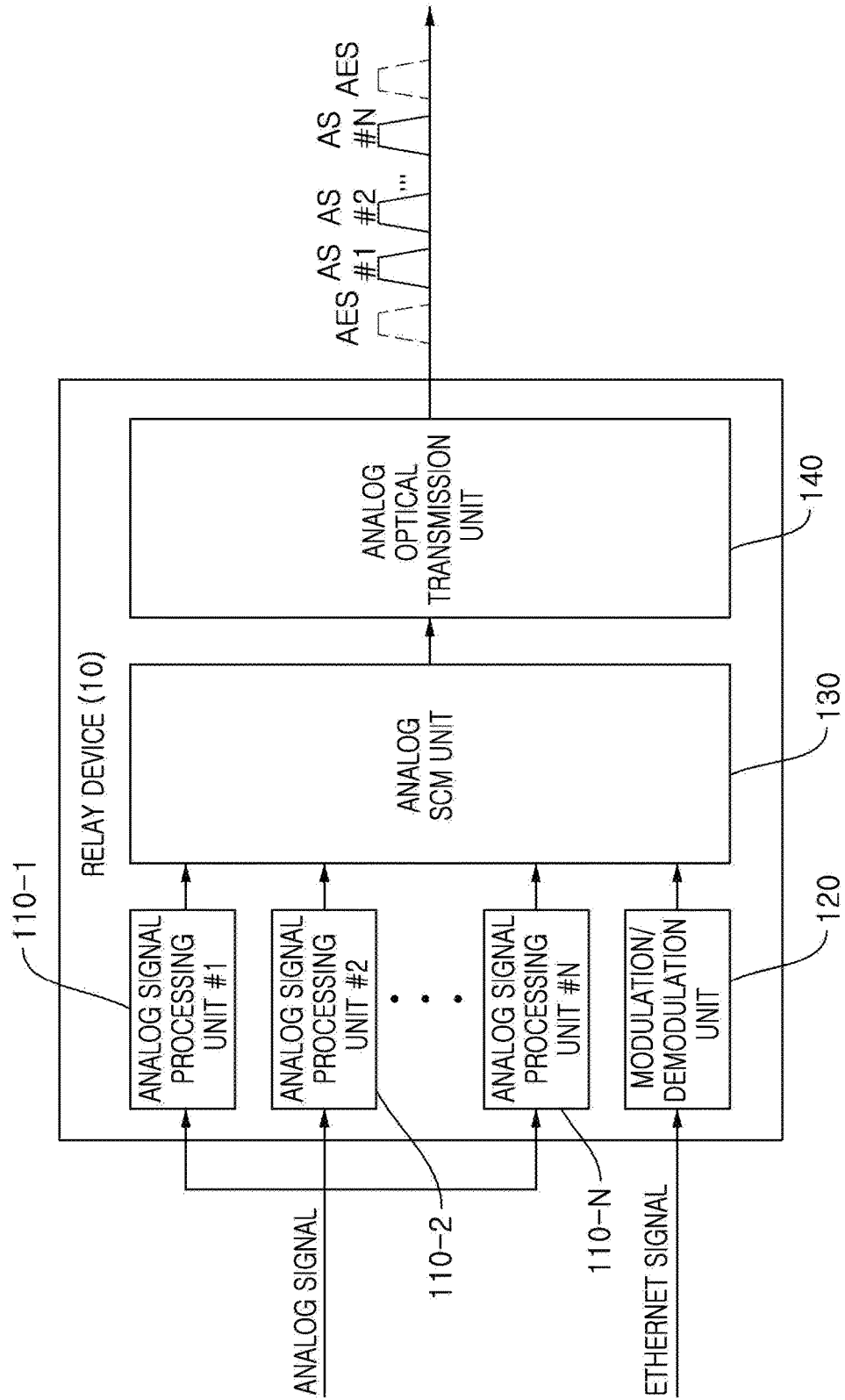
FIG. 1 is a block diagram showing a transmission-side relay device according to an embodiment of the inventive concept.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Throughout the disclosure, like reference numerals refer to like parts throughout the various figures and embodiments of the inventive concept.

In description of the inventive concept, detailed explanation of known related functions and constitutions may be omitted to avoid unnecessarily obscuring the subject manner of the inventive concept. Ordinal numbers (e.g. first, second, etc.) are used for description only, assigned to the elements in no particular order, and shall by no means specify the name of the pertinent element or restrict the claims.

It will be understood that when an element is "connected" or "coupled" to another element, the element may be directly connected or coupled to another element, and there may be an intervening element between the element and another element. To the contrary, it will be understood that when an element is "directly connected" or "directly coupled" to another element, there is no intervening element between the element and another element.

In the existing analog distributed antenna system, a donor unit and each remote unit remotely connected to the donor unit through an optical cable employ an analog signal transmission method and hence do not process digital Ethernet signals. Thus, in an embodiment of the inventive concept, a modulation/demodulation unit (i.e., an analog/Ethernet converter) for receiving a digital Ethernet signal and converting the received digital Ethernet signal into an analog signal (i.e., an analog Ethernet signal) is provided in a donor unit, and analog Ethernet signals converted by the modulation/demodulation unit are transmitted to a remote unit through an optical cable. Also, a modulation/demodulation unit for processing analog Ethernet signals and an Ethernet port are provided in the remote unit for receiving signals from the donor unit, so that Ethernet services can be provided to users by converting analog Ethernet signals into digital Ethernet signals.

In an analog distributed antenna system as described above, the configuration of a donor unit for processing Ethernet signals will be described in detail with reference to FIGS. 1 and 5, and the configuration of a remote unit will be described in detail with reference to FIGS. 2 to 4. Hereinafter, the drawings are depicted in a single direction for convenience and concentration of illustration. It will be apparent that an actual system according to the inventive concept may also be implemented with a bidirectional relay device obtained by combining single-directional components when necessary.

A transmission-side relay device according to an embodiment of the inventive concept will be described with reference to FIG. 1. FIG. 1 is a block diagram showing a transmission-side relay device according to an embodiment of the inventive concept. In the embodiment of the inventive concept, the transmission-side relay device may be a donor unit in an analog distributed antenna system.

The transmission-side relay device 10 according to this embodiment includes analog signal processing units 110-1, 110-2, . . . , 110-N, a modulation/demodulation unit 120, an analog sub carrier multiplexing (SCM) unit 130, and an analog optical transmission unit 140.

The analog signal processing units 110-1, 110-2, . . . , 110-N may be provided in plurality, corresponding to the bandwidth of an analog signal received thereto. Here, the analog signal received to the analog signal processing units 110-1, 110-2, . . . , 110-N may be a base station radio communication signal. The analog signal processing units 110-1, 110-2, . . . , 110-N outputs a signal to the analog SCM unit 130 by performing frequency matching, etc. on the received analog signal.

The first modulation/demodulation unit 120 receives an Ethernet signal (IP network signal) using an Internet protocol and modulates the received Ethernet signal into an analog signal form. That is, the digital Ethernet signal is converted into an analog signal (analog Ethernet signal) by the modulation of the first modulation/demodulation unit 120. In this case, the analog Ethernet signal modulated by the first modulation/demodulation unit 120 is output to the analog SCM unit 130, and multiplexed, together with the signal output from the analog signal processing units, by the analog SCM unit 130 to be transmitted to a remote unit.

The analog SCM unit 130 simultaneously multiplexes the analog signal processed by the analog signal processing units 110-1, 110-2, . . . , 110-N and the analog Ethernet signal converted by the first modulation/demodulation unit 120. The analog SCM unit 130 may perform multiplexing in an SCM manner (analog subcarrier multiplexing). That is, the analog SCM unit 130 multiplexes, in the SCM manner, a plurality of analog signals having different bands, which are processed by the analog signal processing units 110-1, 110-2, ..., 110-N, and an analog Ethernet signal converted by the first modulation/demodulation unit 120, and transmits the multiplexed signals to the remote unit through the analog optical transmission unit 140.

The analog optical transmission unit 140 transmits, to the remote unit, the analog radio communication signal and the analog Ethernet signal, which are multiplexed by the analog SCM unit 130. In this case, the analog optical transmission unit 140 transmits analog radio communication signals AS #1, AS #2, ..., AS #N having a total of N bands and an analog Ethernet signal AES modulated by the first modulation/demodulation unit 120. In this embodiment, the analog optical transmission unit 140 may transmit the modulated analog Ethernet signal AES by using a signal having a band not occupied by the analog radio communication signals AS #1, AS #2, ..., AS #N.

A reception-side relay device according to an embodiment of the inventive concept will be described with reference to FIG. 2. FIG. 2 is a block diagram showing a reception-side relay device according to an embodiment of the inventive concept. Here, the reception-side relay device may be a remote unit constituting the analog distributed antenna system as described above.

The reception-side relay device 20 includes an analog optical reception unit 240, an analog SCM unit 230, analog signal processing units 210-1, 210-2, ..., 210-N, a second modulation/demodulation unit 220, and a multiplexer 250.

The analog optical reception unit 240 receives an analog radio communication signal and an analog Ethernet signal, which are transmitted from the above-described transmission-side relay device 20, and the received signals to the analog SCM unit 230.

The analog SCM unit 230 demultiplexes the analog signals received through the analog optical reception unit 240 to be separated into radio communication signals and an Ethernet signal. The analog SCM unit 230 outputs the separated analog radio communication signals for every band to the respective analog signal processing units 210-1, 210-2, ..., 210-N. The analog radio communication signals are transmitted for every band to the multiplexer 250 through the analog signal processing units 210-1, 210-2, ..., 210-N. Also, the analog SCM unit 230 outputs the separated analog Ethernet signal to the second modulation/demodulation unit 220.

The second modulation/demodulation unit 220 modulates the analog Ethernet signal separated through the analog SCM unit 230 to a digital Ethernet signal. The modulated digital Ethernet signal is connected to external devices through an Ethernet port. In this case, the external devices may correspond to mobile communication devices, other computing devices, etc., such as radio access points, switches, routers, and hubs.

As described above, the analog radio communication signals separated through the analog SCM unit 230 are transmitted to the multiplexer 250 through the analog signal processing units 210-1, 210-2, ..., 210-N. The analog radio communication signals for every band are transmitted to a mobile communication terminal, etc. through a service antenna 20.

Meanwhile, the reception-side relay device may be implemented as an independent relay device. On the other hand, the reception-side relay device may be implemented as a bidirectional transmission device by being combined with the above-described transmission-side relay device.

A reception-side relay device according to another embodiment of the inventive concept will be described with reference to FIGS. 3 and 4. FIG. 3 is a block diagram showing a reception-side relay device according to another embodiment of the inventive concept. FIG. 4 is a detailed block diagram of an Ethernet signal processing unit 220a of FIG. 3.

Figure 2:
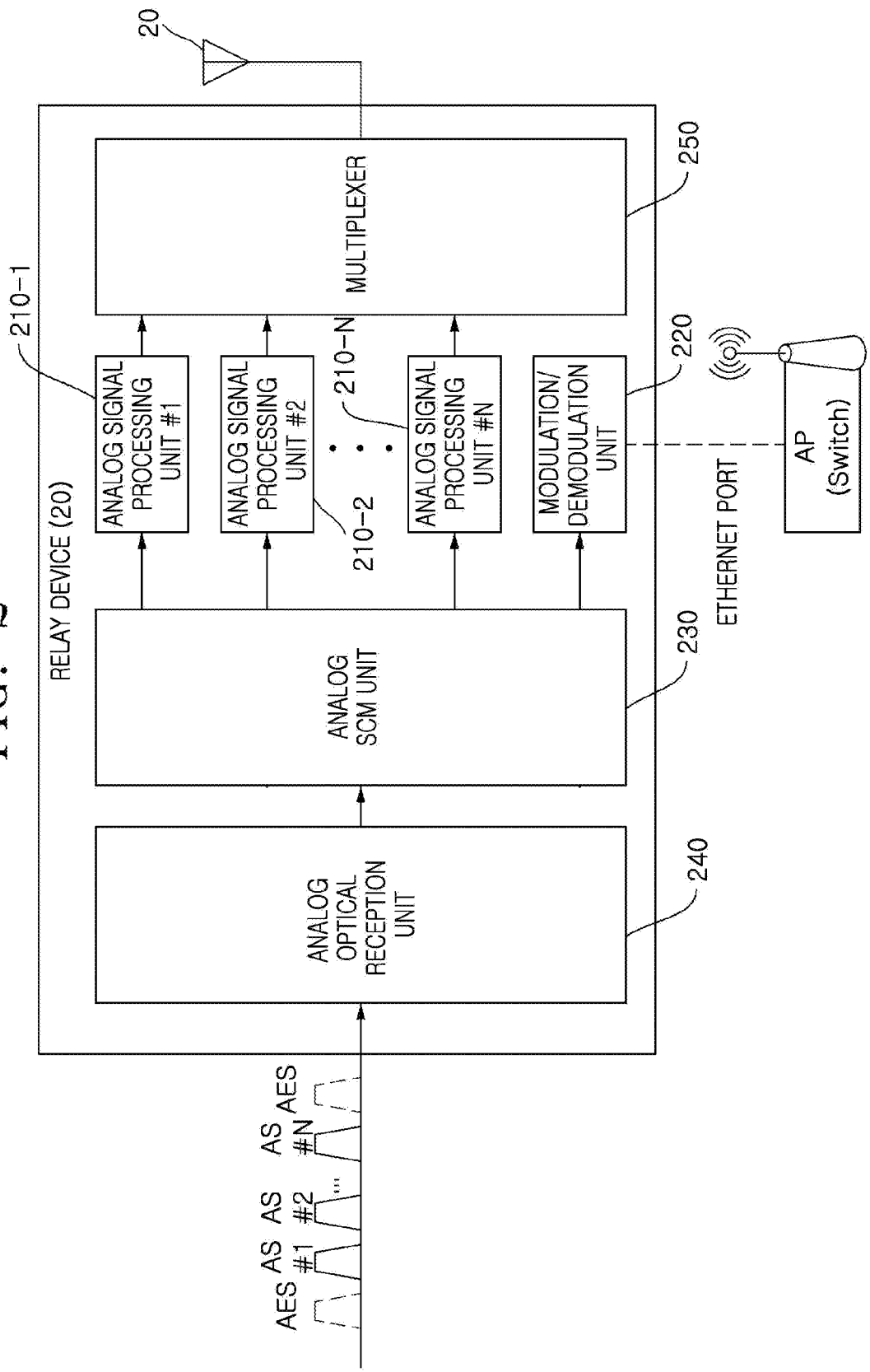
FIG. 2 is a block diagram showing a reception-side relay device according to an embodiment of the inventive concept.

The reception-side relay device 20a according to this embodiment is different from the above-described reception-side relay device of FIG. 2 in that an additional radio communication path for a femtocell or smallcell base station device is provided.

Figure 3:
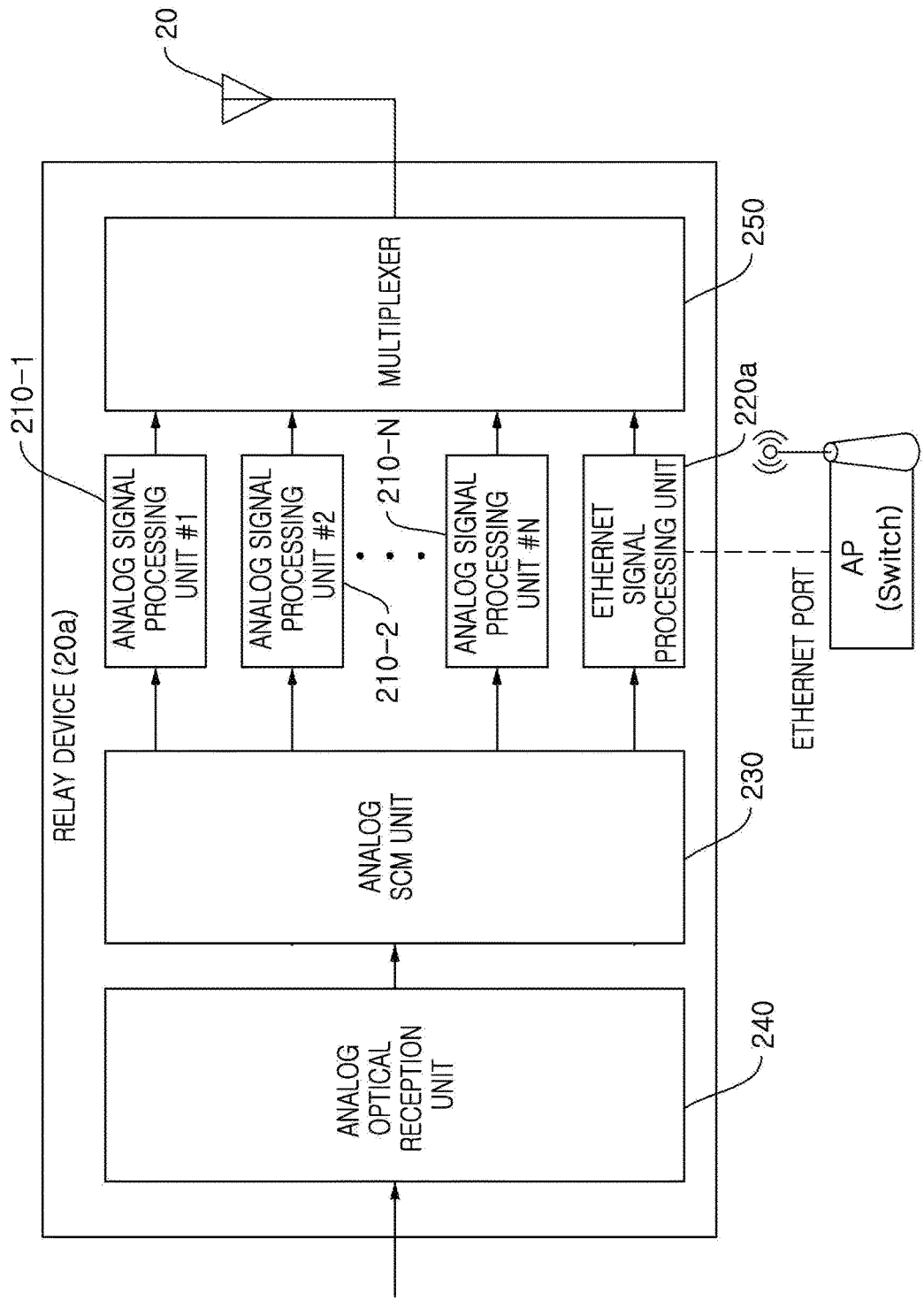
FIG. 3 is a block diagram showing a reception-side relay device according to another embodiment of the inventive concept.

That is, as compared with the reception-side relay device 20 of FIG. 2, it can be seen that the reception-side relay device 20a of FIG. 3 further include a second modulation/demodulation unit 220 and an analog signal processing unit 225 for femtocells/smallcells, which performs signal processing on an Ethernet signal processed by the second modulation/demodulation unit to be converted into an analog radio signal having a frequency band to be transmitted to a femtocell or smallcell base station. Accordingly, in the case of FIGS. 3 and 4, it is possible to provide a digital Ethernet signal from a remote unit through an Ethernet port. In addition, it is possible to ensure an additional wireless communication path for a femtocell or smallcell base station device, thereby extending up to an additional frequency band.

In this case, when a plurality of remote devices exist in the analog distributed antenna system, the Ethernet signal processing unit 220a may be built in each of the plurality of remote device. Alternatively, the Ethernet signal processing unit 220a may be built in only a specific remote device for the purpose of preventing an overload phenomenon in a specific area. That is, the Ethernet signal processing unit 220a is built in a specific remote device as described, so that it is possible to prevent the service quality of the entire network from being deteriorated due to the overload phenomenon in the corresponding area. In addition, it is possible to achieve a system load distribution effect.

A transmission-side relay device according to another embodiment of the inventive concept will be described with reference to FIG. 5. FIG. 5 is a block diagram showing a transmission-side relay device according to another embodiment of the inventive concept.

Figure 5:
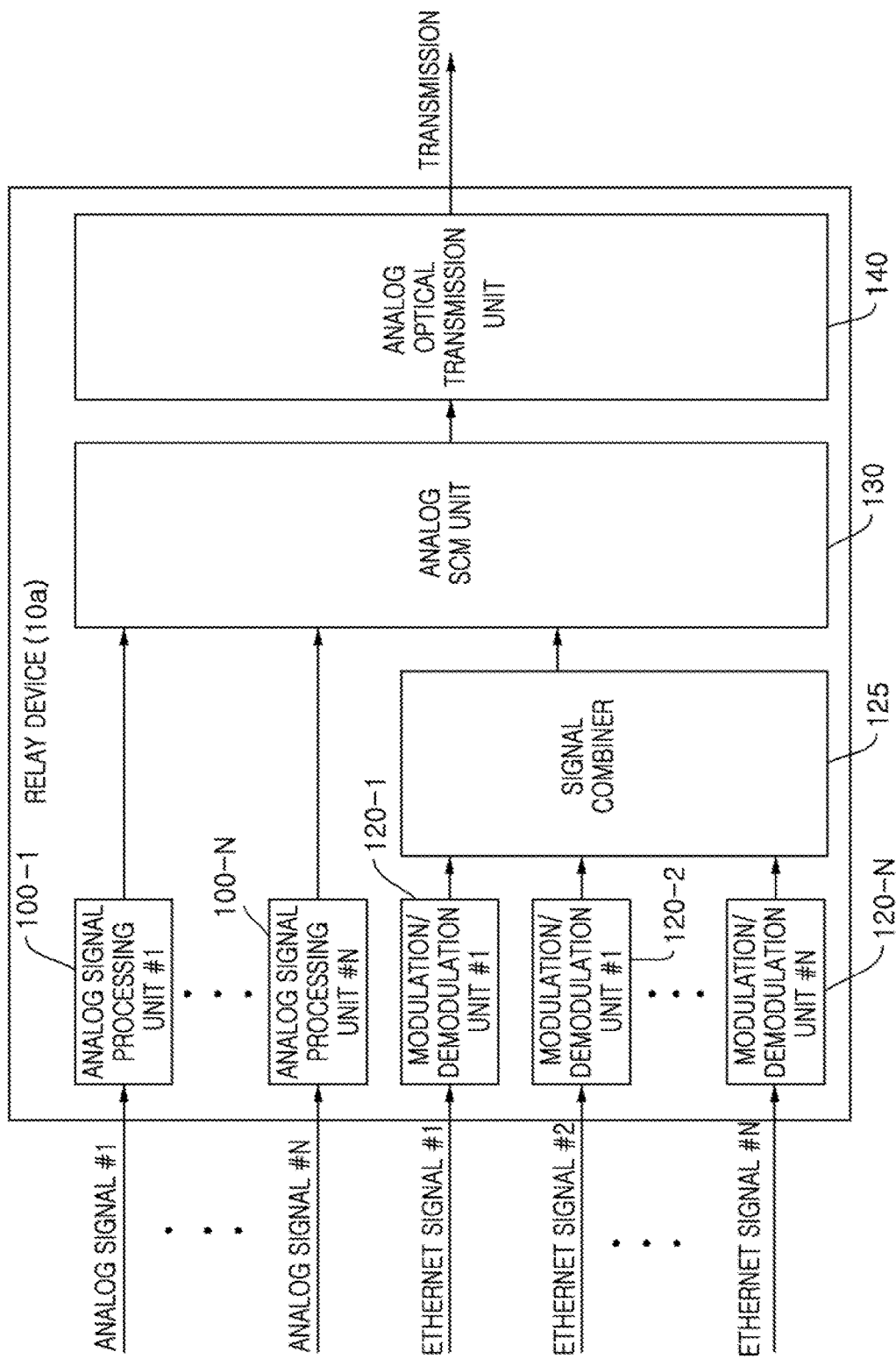
FIG. 5 is a block diagram showing a transmission-side relay device according to another embodiment of the inventive concept.

The transmission-side relay device 10a of FIG. 5 is different from the above-described transmission-side relay device 10 of FIG. 1 in that the modulation/demodulation unit is extended in parallel. Specifically, the transmission-side relay device 10a according to this embodiment receives a plurality of Ethernet signals from a plurality of IP networks. The received Ethernet signals are converted into analog Ethernet signals through modulation/demodulation units 120-1, 120-2, ..., 120-N, respectively, and combined as one signal by a signal combiner 125. Then, the combined signal is transmitted to an analog SCM unit 130.

The analog SCM unit 130 receives and multiplexes analog radio communication signals transmitted from analog signal processing units 100-1, 100-2, ..., 100-N and analog Ethernet signals output through the signal combiner 125. The analog radio communication signals and the analog Ethernet signals, which are multiplexed by the analog SCM unit 130, are transmitted to other relay devices through an analog optical transmission unit 140.

Thus, according to the transmission-side relay device of FIG. 5, a plurality of Ethernet signals can be processed, so that it is possible to extend the bandwidth of Ethernet signals.

Figure 4:
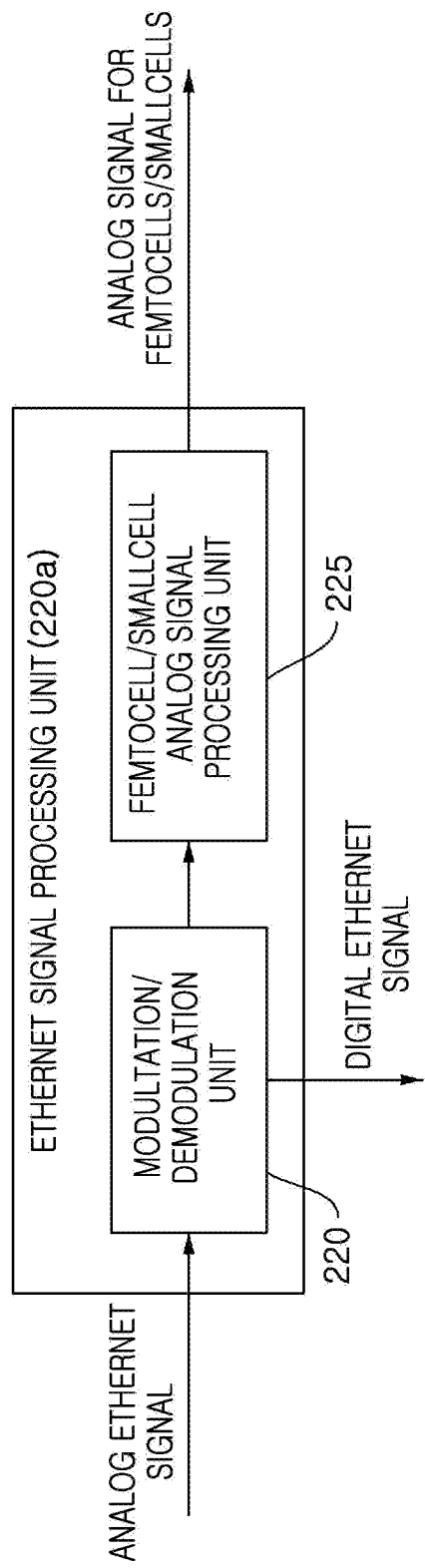
FIG. 4 is a block diagram of an Ethernet signal processing unit of FIG. 3.

When the plurality of modulation/demodulation units 120-1, 120-2, ..., 120-N is provided in the transmission-side relay device to perform signal processing on Ethernet signals having multiple bands as shown in FIG. 5, the Ethernet signal processing unit 220a described in FIGS. 3 and 4 may also be provided in plurality, corresponding to the transmission-side modulation/demodulation units 120-1, 120-2, ..., 120-N, in the reception-side relay device receiving the signal-processed Ethernet signals.

That is, corresponding to the transmission-side relay device according to the embodiment of FIG. 5, in the reception-side relay device, a plurality of Ethernet signal processing unit 220a may be provided in parallel (as a result, a plurality of second modulation/demodulation units 220 and a plurality of analog signal processing units 225 for femtocells or smallcells, respectively corresponding thereto may be provided in parallel). Accordingly, signal processing is performed for each corresponding frequency band through the receptions-side relay device receiving Ethernet signals having multiple frequency bands, so that it is possible to design a network for extending or controlling the system load distribution effect.

While the inventive concept has been described with respect to the specific embodiments, it will be apparent to those skilled in the art that various changes and modifications may be made without departing from the spirit and scope of the inventive concept as defined in the following claims.

What is claimed is:

1. A device for an analog distributed antenna system, the device comprising:
   a first analog signal processing unit configured to receive an analog communication signal from a base station;
   a first modulation/demodulation unit configured to convert a digital Ethernet signal received from an Ethernet network into an analog Ethernet signal;
   a multiplexing unit configured to generate a multiplexed signal by multiplexing the analog communication signal signal-processed by the analog signal processing unit and the analog Ethernet signal converted by the modulation/demodulation unit; and
   a transmission unit configured to transmit the multiplexed signal to another device that is communicatively coupled to the device over a communication medium in the analog distributed antenna system.

2. The device of claim 1, wherein the first modulation/demodulation unit is provided in plurality to each receive an independent Ethernet signal and convert the received Ethernet signal into an analog Ethernet signal, and
   wherein the device comprises a signal combiner configured to combine, as a single signal, analog Ethernet signals output from the plurality of first modulation/demodulation units, and output the combined signal to the multiplexing unit.

3. The device of claim 1, wherein the multiplexing unit multiplexes the analog communication signal and the analog Ethernet signal in a subcarrier multiplexing (SCM) manner.

4. The relay device of claim 1, wherein the analog Ethernet signal occupies a frequency band that is not occupied by the analog communication signal in the multiplexed signal.

5. A device for an analog distributed antenna system, the device comprising:
   a demultiplexing unit configured to demultiplex a multiplexed signal transmitted from another device that is communicatively coupled to the device over a communication medium in the analog distributed antenna system to be separated into an analog communication signal and an analog Ethernet signal; and
   a second modulation/demodulation unit configured to convert the analog Ethernet signal into a digital Ethernet signal,
   wherein the analog communication signal is a base station signal.

6. The device of claim 5, further comprising an Ethernet port configured to receive the digital Ethernet signal output from the second modulation/demodulation unit.

7. The device of claim 6, wherein the second modulation/demodulation unit transmits, through the Ethernet port, the digital Ethernet signal to any one of a radio access point, a switch, a router, and a hub, which is connected to the Ethernet port to provide connection with at least one of a mobile communication terminal and an external computing device.

8. The device of claim 5, further comprising a signal processing unit for femtocells or smallcells, configured to receive the digital Ethernet signal converted by the second modulation/demodulation unit, and perform signal processing such that the digital Ethernet signal is transmitted to a femtocell or smallcell base station device.

9. The device of claim 8, wherein the second modulation/demodulation unit is provided in plurality to each receive an independent analog Ethernet signal, and
   wherein the signal processing unit for femtocells or smallcells is provided in plurality, respectively corresponding to the plurality of second modulation/demodulation units, to perform signal processing for frequency bands of the independent analog Ethernet signals.

10. An analog distributed antenna system comprising:
    a transmission-side device and a reception-side device communicatively coupled to the transmission-side device over a communication medium,
    wherein the transmission-side device including:
    a first analog signal processing unit configured to receive an analog communication signal from a base station;
    a first modulation/demodulation unit configured to convert a digital Ethernet signal received from an Ethernet network into an analog Ethernet signal;
    a multiplexing unit configured to generate a multiplexed signal by multiplexing the analog communication signal signal-processed by the analog signal processing unit and the analog Ethernet signal converted by the modulation/demodulation unit; and
    a transmission unit configured to transmit the multiplexed signal to the reception-side device, and
    wherein the reception-side device including:
    a demultiplexing unit configured to demultiplex the multiplexed signal transmitted from the transmission-side device through the communication medium to be separated into the analog communication signal and the analog Ethernet signal; and
    a second modulation/demodulation unit configured to convert the analog Ethernet signal into the digital Ethernet signal.

* * * * *